(12) United States Patent
Chen et al.

(10) Patent No.: US 7,138,373 B2
(45) Date of Patent: Nov. 21, 2006

(54) POLYSACCHARIDE-BASED POLYMERS AND METHODS OF MAKING THE SAME

(75) Inventors: Tianhong Chen, Newark, DE (US); Heather D. Embree, Baltimore, MD (US); Eleanor M. Brown, Oreland, PA (US); Maryann M. Taylor, Richboro, PA (US); Gregory F. Payne, Hunt Valley, MD (US)

(73) Assignees: University of Maryland, Baltimore County, Baltimore, MD (US); University of Maryland Biotechnology Institute, Baltimore, MD (US); The United States of America as represented by the Secretary of the Agriculture, Washington, DC (US)

( * ) Notice: Subject to any disclaimer, the term of this patent is extended or adjusted under 35 U.S.C. 154(b) by 0 days.

(21) Appl. No.: 10/529,012

(22) PCT Filed: Sep. 26, 2003

(86) PCT No.: PCT/US03/30737
§ 371 (c)(1),
(2), (4) Date: Mar. 24, 2005

(87) PCT Pub. No.: WO2004/029096
PCT Pub. Date: Apr. 8, 2004

(65) Prior Publication Data
US 2006/0078962 A1 Apr. 13, 2006

Related U.S. Application Data

(60) Provisional application No. 60/413,917, filed on Sep. 26, 2002.

(51) Int. Cl.
*A61K 38/16* (2006.01)
*C08B 37/08* (2006.01)
*C07K 2/00* (2006.01)

(52) U.S. Cl. .................... 514/12; 530/354; 530/395; 530/411; 536/20

(58) Field of Classification Search ............... None
See application file for complete search history.

(56) References Cited

U.S. PATENT DOCUMENTS

| | | | |
|---|---|---|---|
| 4,148,689 A | 4/1979 | Hino et al. | |
| 5,015,576 A | 5/1991 | Nilsson et al. | |
| 5,147,698 A | 9/1992 | Cole | |
| 5,412,083 A * | 5/1995 | Giese et al. | 536/20 |
| 5,422,116 A | 6/1995 | Yen et al. | |
| 5,474,989 A | 12/1995 | Hashimoto et al. | |
| 5,658,592 A * | 8/1997 | Tanihara et al. | 424/488 |
| 6,044,800 A * | 4/2000 | Kubo et al. | 119/710 |
| 6,245,901 B1 | 6/2001 | Von der Osten et al. | |
| 6,562,363 B1 | 5/2003 | Mantelle et al. | |
| 6,623,950 B1 | 9/2003 | Von der Osten et al. | |
| 6,638,621 B1 | 10/2003 | Anderson et al. | |
| 2002/0084194 A1 | 7/2002 | Redepenning | |

FOREIGN PATENT DOCUMENTS

| | | | |
|---|---|---|---|
| JP | 56-131639 | * | 10/1981 |
| JP | A-9 239 396 | | 9/1997 |
| WO | WO 00/11038 | | 3/2000 |
| WO | WO/2004/018741 | | 3/2004 |

OTHER PUBLICATIONS

Muzzarelli et al., Tyrosinase-mediated Quinone Tanning of Chitinous Materials, Carbohydrate Polymers, 1994, vol. 24, No. 4, pp. 295-300.*
Chen et al., "Combinatorial Screening for Enzyme-Mediated Coupling. Tyrosinase-Catalyzed Coupling To Create Protein-Chitosan Conjugates," Biomacromolecules 2001, 2, 456-462.*
Vazquez-Duhalt et al., "Enzyme Conjugation of the Polysaccharide Chitosan: Smart Biocatalysts and Biocatalytic Hydrogels," Bioconjugate Chem. 2001, 12, 301-306.*
Sun et al., Tyronsinase-Containing Chitosan Gels: A Combined Catalyst and Sorbent for Selective Phenol Removal. Biotechnology and Bioengineering, vol. 51, pp. 79-86 (1996).
Tatsumi, K. et al., Removal of Phenols from Wastewater by an Enzyme and Chitosan, Advances in Chitin Sciences, vol. 2, pp. 864-869 (1997).
Wada et al., "Removal of Phenols and Aromatic Amines from Wastewater by a Combination . . . a Coagulent," Biotechnology & Bioengineering, vol. 45, pp. 304-309 (1995).
Payne et al., "Tyrosinase Reaction/Chitosan Adsorption for Selectively Removing Phenols from Aqueous Mixtures," Biotechnology & Bioengineering, 40, No. 9 (1992).
Seong, et al., "Fabrication of Microchambers Defined by Photopolymerized Hydrogels and Weirs . . . ," Analytical Chemistry, vol. 74, No. 14, pp. 3372-3377 (2002).

(Continued)

*Primary Examiner*—Robert A. Wax
(74) *Attorney, Agent, or Firm*—Edell, Shapiro & Finnan, LLC

(57) ABSTRACT

Gels and polymers comprising a polypeptide bound to a polysaccharide are disclosed. Specific polypeptides include, but are not limited to, polypeptides that comprise glutamine or tyrosine residues. Specific polysaccharides include, but are not limited to, chitosan. Gels and polymers of the invention can be used for the in vitro and in situ formation of protein-polysaccharide conjugates. Methods of making polypeptide/polysaccharide gels and polymers are also disclosed.

10 Claims, 12 Drawing Sheets

OTHER PUBLICATIONS

Gao, et al., "Lateral Patterning of CdTe Nanocrystal Films by the Electric Field Directed Layer-by-Layer Assembly Method," Langmuir, vol. 18, pp. 4098-4102 (2002).

Sirkar et al., "Amperometric Biosensors Based on Oxidoreductases Immobilized in Photopolymerized . . . " Analytic Chemistry, vol. 70, No. 14, pp. 2888-2894 (1998).

Li-Qun Wu, et al., "Chitosan-Mediated and Spatially Selective Electrodeposition of Nanoscale Particles," Langmuir, vol. 21, No. 8, pp. 3641-3646, 2005.

Li-Qun Wu, et al., Spatially Selective Deposition of a Reactive Polysaccharide Chitosan Layer onto a Patterned Template, Langmuir, vol. 19, No. 3, pp. 519-524 (2003).

Li-Qun Wu, et al., "Voltage-Dependent Assembly of the Polysaccharide Chitosan onto an Electrode Surface," Langmuir, vol. 18, No. 22, pp. 8620-8625 (2002).

Tianhong Chen, et al., "Enzymatic Methods for in Situ Cell Entrapment and Cell Release," Biomacroolecules, vol. 4, No. 6, pp. 1558-1563 (2003).

Mark J. Kastantin, et al., "Integrated Fabrication of Polymeric Devices for Biological Applications," Invited Paper, Journal of Sensors and Materials, pp. 1-18 (Sep. 2003).

Tianhong Chen, et al., "Nature-Inspired Creation of Protein-Polysaccharide Conjugate and Its Subsequent . . . Patterned Surface," Langmuir, vol. 19, No. 22, pp. 9382-9386 (2003).

Rohan Fernandes, et al., "Electrochemical Induced Deposition of a Polysaccharide Hydrogel onto a Patterned Surface," Langmuir, vol. 19, No. 10, pp. 4058-4062 (2003).

Hyunmin, Yi, et al., "A Robust Technique for Assembly of Nucleic Acid Hybridization .. Chitosan", Analytical Chemistry, vol. 76, No. 2, pp. 365-372 (Jan. 15, 2004).

Rohan Fernandes, et al., "Thermo-Biolithography: A Technique for Patterning Nucleic Acids and Proteins," Langmuir, vol. 20, No. 3, pp. 906-913 (2004).

Li-Qun Wu, et al. "Spatially-Selective Assembly of a Reactive Polysaccharide Layer onto Patterned Surfaces," PowerPoint Presentation given Nov. 8, 2002 (22 slides).

Takenaka, et al., Sol-gel Preparation of a Single Layer, 0.75 micron thick lead zirconate titanate films . . . , "Applied Physics Letters," vol. 79, No. 21 pp. 3485-3487 (2001).

O'Connor, et al., "Immobilization of Neural Cells in Three-Dimensional Matrices for Biosensor Applications," Biosensors & Bioelectrics, vol. 14, pp. 871-881 (2000).

Zhitomirsky, et al., "Cathodic Electrodeposition of Polymer Films and Organoceramic Films," Materials Science and Engineering, vol. B78, pp. 125-130 (2000).

Chen, et al., "Self-Assembly of Monolayers of Cadmium Selenide Nanocrystals with Dual Color Emission," Langmuir, vol. 15, pp. 6845-6850 (1999).

Clark, "Engineering the Microfabrication of Layer-by-Layer Thin Films," Advanced Materials (1998).

* cited by examiner

US 7,138,373 B2

POLYSACCHARIDE-BASED POLYMERS AND METHODS OF MAKING THE SAME

RELATED APPLICATIONS

This application is a national stage filing under 35 U.S.C. §371 of International Application No. PCT/US2003/030737 filed Sep. 26, 2003, published in English This application claims priority to U.S. provisional application No. 60/413,917, filed Sep. 26, 2002, the entirety of which is incorporated herein by reference.

STATEMENT REGARDING FEDERALLY SPONSORED RESEARCH OR DEVELOPMENT

The United States government may have certain rights to this invention, pursuant to Grant No BES-0114790, awarded by the National Science Foundation.

BACKGROUND OF THE INVENTION

1. Field of the Invention

This invention is directed, in part, to polymers and gels comprising a polypeptide and a polysaccharide, and to methods of making the same.

2. Description of Related Art

Hydrogels are providing new opportunities for a variety of medical applications. *Biomaterials Science: An Introduction to Materials in Medicine* (Ratner B D et al., eds.; 1996); Okano T. *Biorelated Polymers and Gels* (1998). Examples include the use of hydrogels as skin substitutes, adhesives, matrices for drug delivery, and scaffolds for tissue engineering. See, e.g., *Biomaterials Science: An Introduction to Materials in Medicine*; Peppas N A and Sahlin J J, *Biomaterials* 17:1553–1561 (1996); McCulloch I and Shalaby S W, "Tailored polymeric materials for controlled delivery systems" (Washington D.C.: American Chemical Society, 1998); Dinh S M, DeNuzzio J D and Comfort A R, "Intelligent materials for controlled release" (Washington D.C.: American Chemical Society, 1999); Mallapragada S, Tracy M, Narasimhan B, Mathiowitz E and Korsmeyer R., "Biomaterials for drug delivery and tissue engineering" (Warrendale, Pa.: Materials Research Society, 2001); Lee K Y and Mooney D J, *Chem. Rev.* 101:1869–1879 (2001). In many of these applications it would be desirable if the hydrogel could be formed in situ. For instance, it would be possible to "implant" materials using minimally invasive methods if systems were available that could be injected as solutions and gelled only after injection. Elisseeff J, et al., *Proc. Natl. Acad. Sci.* 96:3104–3107 (1999). Further, in situ gel formation would allow gels to be created that filled the available space. Gutowska A, Jeong B and Jasionowski M., *Anat Rec.* 263:342–349 (2001); Gerentes P, et al., *Biomaterials* 23:1295–1302 (2002). Obviously, major constraints on such gel-forming systems are that they must be non-toxic and biocompatible.

There are a few common approaches for creating gels that could be extended to in situ systems. One approach commonly used for in vitro gel formation is to initiate polymerization reactions in the presence of multi-functional monomers. Since these multi-functional monomers are incorporated into two (or more) growing polymer chains the reaction leads to a three-dimensional network. Huang Y, Szleifer I and Peppas N A, *Macromolecules* 35:1373–1380 (2002). An example of this approach for in situ applications is the cyanoacrylate adhesives. Smith D C, "Adhesives and sealants," *Biomaterials Science: An Introduction to Materials in Medicine* p. 319–328 (Ratner B D et al., eds.; 1996). Since low molecular weight and reactive monomers are used, this approach raises concerns of toxicity and compatibility. A second approach for forming gels which is particularly attractive for in situ applications is to use "smart" polymers that gel in response to the conditions experienced after injection/application. Galaev I Y and Mattiasson B, *Trends Biotechnol* 17:335–340 (1999). Typical smart polymers respond to changes in temperature or pH and can be made of natural (e.g., gelatin) or synthetic (e.g., poly(ethylene oxide)-poly(propylene oxide)-poly(ethylene oxide)) polymers. Bromberg L E and Barr D P, *Macromolecules* 32:3649–3657 (1999); Huibers P D T, et al., *Macromolecules* 32:4889–4894 (1999). This approach is attractive for in situ applications although there are currently few smart polymers that are also biocompatible. A third approach for gel formation is to initiate the crosslinking of soluble, linear polymers or macromonomers. Typically, crosslinking is initiated using light or low molecular weight crosslinking agents such as glutaraldehyde. See, e.g., Elisseeff J, et al., *J. Biomed. Mater. Res.* 51:164–171 (2000); Ono K, et al., *J. Biomed. Mater. Res.* 49:289–295 (2000); Bryant S J and Anseth K S, *Biomaterials* 22:619–626 (2001); Behravesh E, Jo S, Zygourakis K and Mikos A G, *Biomacromolecules* 3:374–381 (2002); Temenoff J S, et al., *J. Biomed. Mater. Res.* 59:429–437 (2002); Koh W G, Revzin A and Pishko M V, *Langmuir* 18:2459–2462 (2002); Mi F-L, et al., *Carbohydrate Polymers* 41:389–396 (2000); Bigi A, et al., *Biomaterials* 22:763–768 (2001). For in situ applications there are safety concerns associated with the use of such low molecular weight and reactive compounds (i.e., monomers or initiators).

In many cases, natural polymers are advocated as biomaterials because they may be non-toxic, biodegradable, and have low immunogenicities. Yannas I V, "Natural Materials," *Biomaterials Science: An Introduction to Materials in Medicine* p. 84–94 (Ratner B D et al., eds.; 1996). In addition to reducing or avoiding adverse effects, biopolymers may actually offer beneficial properties. For instance collagen is a major component of the extracellular matrix of tissue, and collagen (or gelatin) based materials are reported to promote cell attachment and growth. Koide M, et al., *J. Biomed. Mater. Res.* 27:79–87 (1993); Stanton J S, et al., *J. Mater. Sci.-Mater. Med.* 6:739–744 (1995). Chitosan has also been reported to have antimicrobial hemostatic, and wound healing properties that could be exploited for biomaterials. Muzzarelli R, et al., *Antimicrob. Agents Chemother.* 34:2019–2023 (1990); Mi F L, et al., *Biomaterials* 22:165–173 (2001); Mi F, et al., *J. Biomed. Mater. Res.* 59:438–449 (2002); Rao S B and Sharma C P, *J. Biomed. Mater. Res.* 34:21–28 (1997); Ishihara M, et al., *Biomaterials* 23:833–840 (2002); Muzzarelli R, et al., *Biomaterials* 9:247–252 (1988); Ueno H, et al., *Biomaterials* 20:1407–1414 (1999); Cho Y W, et al., *Biomaterials* 20:2139–2145 (1999).

Apart from having the desirable chemical and biological properties, biomaterials must have the mechanical properties (e.g., strength, hardness and durability) required by whatever applications they are used in. Anseth K, et al., *Biomaterials* 17:1647–1657 (1996). The mechanical properties of tissue are often conferred by protein-polysaccharide conjugates (e.g., proteoglycans and mucins), and there has been considerable recent interest in generating such conjugates for various applications, especially as dressings and scaffolds for tissue engineering. See, e.g., Yannas I V, et al., *Proc. Natl. Acad. Sci. USA* 86:933–937 (1989); Yannas I V and Burke J F, *J. Biomed. Mater. Res.* 14:65–81 (1980); Choi Y S, et al., *J. Biomed. Mater. Res.* 48:631–639 (1999); Angele P, et al., *Tissue Eng.* 5:545–554 (1999). Unfortunately, the complexity of protein-polysaccharide conjugates has made it difficult to recover or synthesize these glycoconjugates.

SUMMARY OF THE INVENTION

This invention encompasses novel polymers and polymer gels comprised of two biopolymers, the first of which is polypeptide, such as gelatin or collagen, and the second of which is a polysaccharide, such as chitosan.

The invention also encompasses methods of making polymers and polymer gels using an enzyme such as, but not limited to, tyrosinase or transglutaminase. Particular methods of the invention allow for the in situ formation of a polymer or gel where and when it is needed, and in a biocompatible manner. Methods of using the polymers and gels are also encompassed by the invention.

BRIEF DESCRIPTION OF THE DRAWINGS

Certain aspects of the invention can be understood with regard to the appended figures.

DETAILED DESCRIPTION OF THE INVENTION

This invention is directed, in part, to a novel polymers and polymer gels. In a first embodiment, the invention encompasses a polymer comprising a polypeptide and a polysaccharide. Preferred polypeptides comprise a tyrosine or glutamine residue. Examples of specific polypeptides include, but are not limited to, gelatin and collagen. Preferred polypeptides and polysaccharides are biocompatible and non-immunogenic. Examples of specific polysaccharides include, but are not limited to, chitosan.

Specific polymers of the invention are isolated, e.g., they exist outside and apart from a plant, animal or cell. Particular compositions of the invention consist of the polymers disclosed herein or consist essentially of such polymers.

Specific gels of the invention have an elastic modulus (G') of greater than about 5, 10, 15, 35, 50, 100, 200, 250, 300, or 350 Pa.

Another embodiment of the invention encompasses a gel comprising a polypeptide and a polysaccharide. Preferred polypeptides comprise a tyrosine or glutamine residue. In a specific gel, the polypeptide and polysaccharide are covalently bound. Particular gels further comprise an enzyme such as, but not limited to, tyrosinase or transglutaminase.

The invention also encompasses a method of making a polymer or a polymer gel which comprises contacting a polypeptide and polysaccharide with an enzyme under conditions sufficient to covalently bind the polypeptide to the polysaccharide. If the polypeptide comprises a tyrosine residue, the enzyme is preferably a tyrosinase. If the polypeptide comprises a glutamine residue, the enzyme is preferably a transglutaminase.

Figure 1:
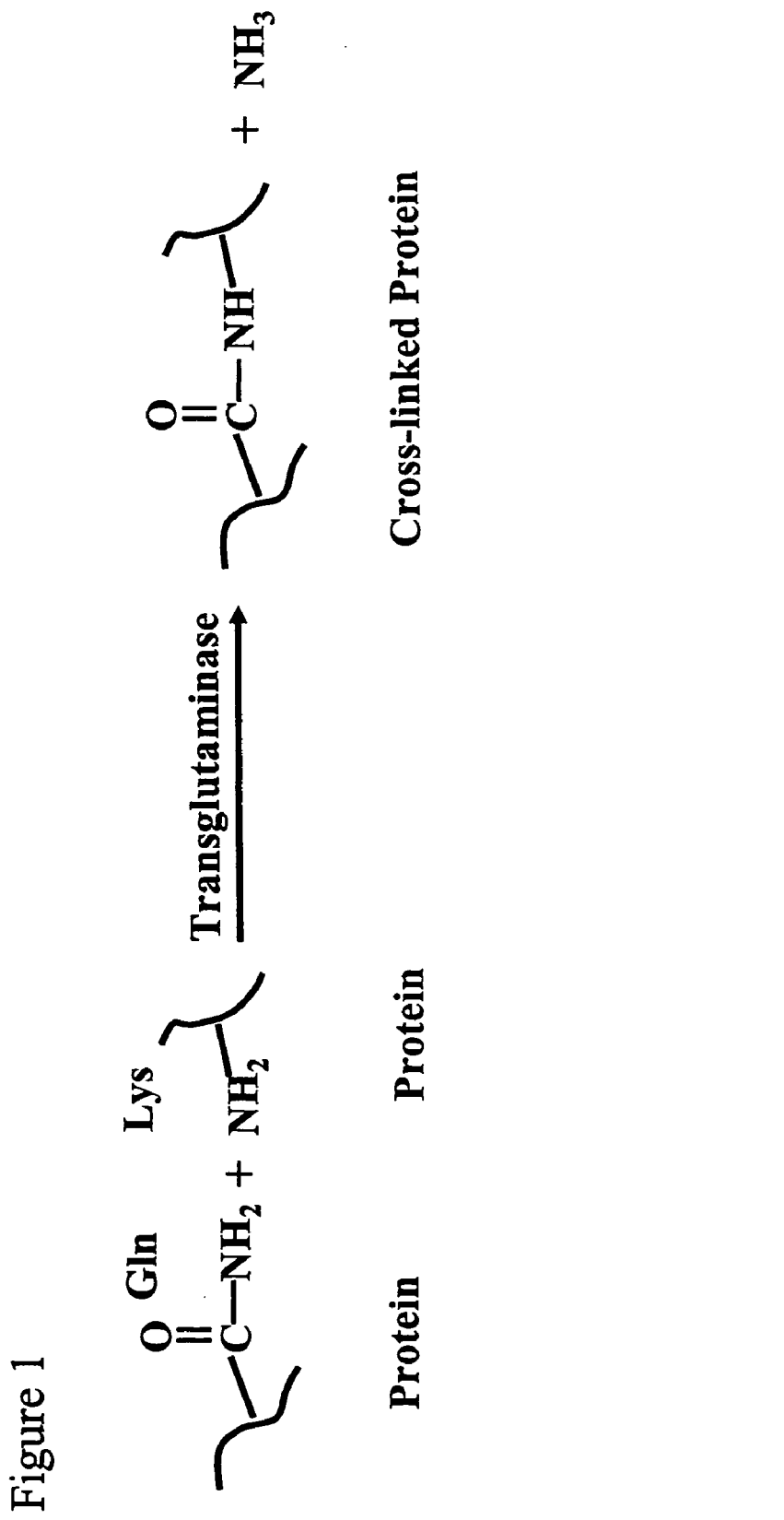
FIG. 1. A representation of polymer cross-linking using transglutaminase.

As used herein, the terms "transglutaminase enzyme" and "transglutaminase" refer to an enzyme that catalyzes transamidation reactions, such as, but not limited to, the one represented in FIG. 1. Specific transamidation reactions yield Nε-(γ-glutamyl)lysine crosslinks in proteins or between proteins and polysaccharides such as chitosan. Transglutaminase enzymes that can be used in the methods and compositions of the invention are known in the art and are readily available. See, e.g., Greenberg C S, Birckbichler P J and Rice R H, *FASEB J* 5:3071–3077 (1991); Ahvazi B, et al., *EMBO J* 21:2055–2067 (2002); Pisano J J, Finlayson J S and Peyton M P, *Sci.* 160:892–893 (1968); Karpuj M V, et al., *Nat. Med.* 8:143–149 (2002); Sakamoto H, Kumazawa Y and Motoki M, *J. Food Sci.* 59:866–871 (1994); Dickinson E and Yamamoto Y, *J. Agric. Food Chem.* 44:1371–1377 (1996); Fuchsbauer H L, et al., *Biomaterials* 17:1481–1488 (1996); Faergemand M, Murray B S and Dickinson E, *J. Agric. Food Chem.* 45: 2514–2519 (1997); Lim L T, Mine Y and Tung M A, *J. Food Sci.* 64:616–622 (1999); Seitz A, et al., *Biomacromolecules* 2:233–238 (2001); Babin H and Dickinson E, *Food Hydrocolloids* 15:271–276 (2001); Siu N, et al., *J. Agric. Food Chem.* 50:2666–2672 (2002); Motoki M and Seguro K, *Trends in Food Science & Technology* 9:204–210 (1998); Benjakul S, et al., *J. Sci. Food Agric.* 81:102–108 (2000).

As used herein, the terms "tyrosinase enzyme" and "tyrosinase" refer to an enzyme capable of converting low molecular weight phenols (e.g., tyrosine) and accessible tyrosyl residues of proteins into quinones. Preferred quinones are chemically reactive and can undergo non-enzymatic reactions with a variety of nucleophiles as shown, for example, in FIG. 2. Tyrosinases that can be used in the methods and compositions of the invention are well known and readily available. See, e.g., Huang K, et al., *Biomacromolecules* 3:397–406 (2002); Waite J H and Tanzer M L, *Sci.* 212:1038–1040 (1981); Waite J H, *Int. J. Biol. Macromolec.* 12:139–144 (1990); Hansen C, Corcoran S G and Waite J H, *Langmuir* 14:1139–1147 (1998); Yu M, Hwang J and Deming T J, *JACS* 121:5825–5826 (1999); Burzio L A and Waite J H, *Biochem.* 39:11147–11153 (2000); Burzio L A and Waite J H, *Prot. Sci.* 10:735–740 (2001); Peter M G, *Angew. Chem. Int. Ed. Engl.* 28:555–570 (1989); Sugumaran M., *Adv. Insect Physiol.* 21:179–231 (1988); and Andersen S O, Peter M G and Roepstorff P, *Comp. Biochem. Physiol.* 113B:689–705 (1996).

Polymers of the invention are prepared by coupling a polypeptide and a polysaccharide. This is preferably done using a suitable enzyme and under conditions that allow the coupling reaction to occur. For example, in cases where a tyrosine residue of the polypeptide is to be used to couple the polypeptide to the polysaccharide, the tyrosine residue must be accessible to the enzyme. In some cases, the residue is readily accessible. However, if the tyrosine residue is buried in the polypeptide, the coupling reaction can be conducted under conditions that denature the polypeptide to a sufficient degree but do not destroy the activity of the enzyme. Such conditions, such as salt concentration, heat, and the use of various solvents and buffers, are well known the art and will vary with the specific polypeptide and polysaccharide. Similarly, in cases where a glutamine residue of the polypeptide is used to couple it to the polysaccharide, the glutamine residue must be accessible to the enzyme used to couple the polymers.

Figure 2:
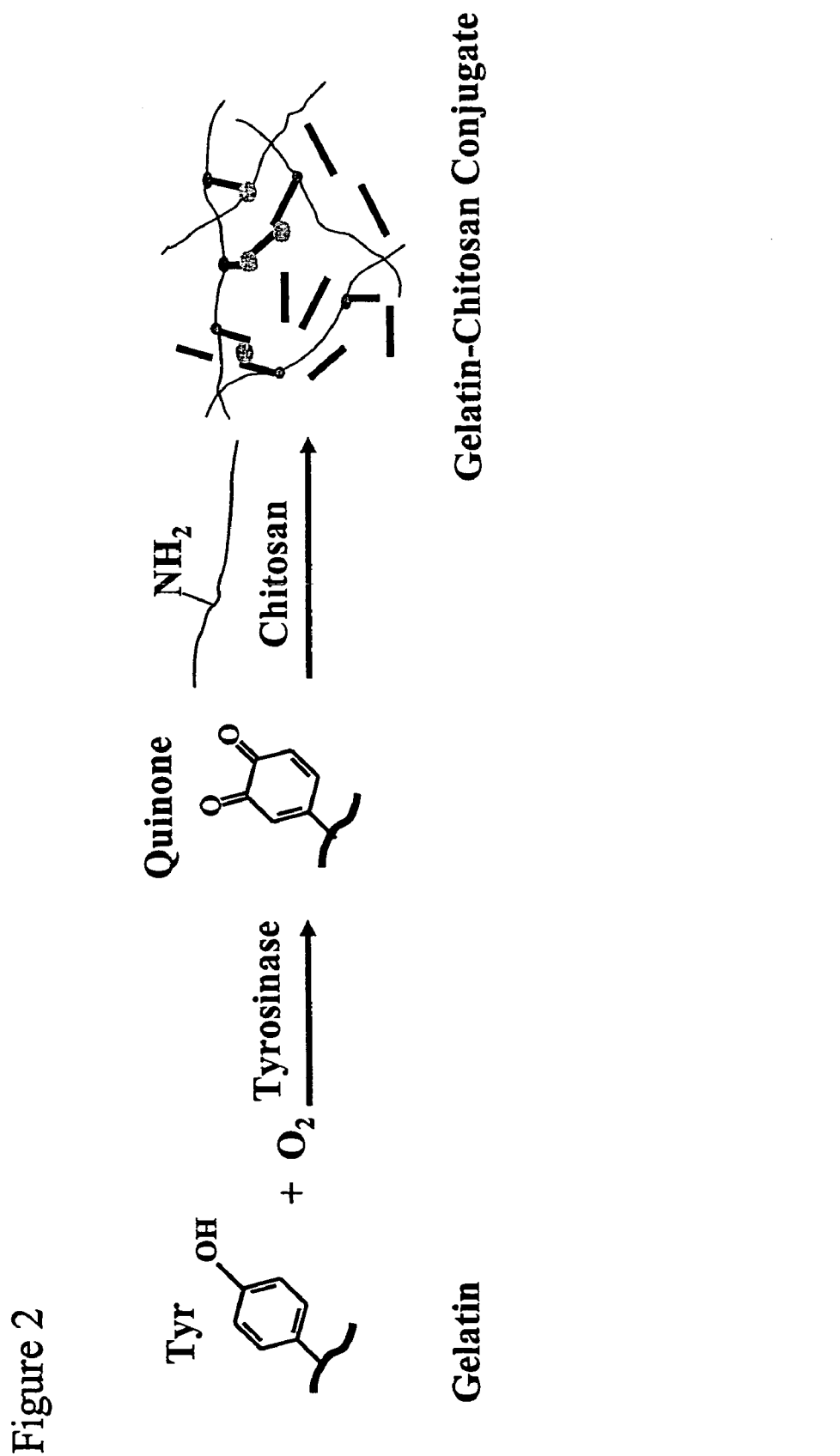
FIG. 2. A representation of polymer cross-linking using tyrosinase.

Without being limited by theory, it is believed that certain gels of the invention have a macromolecular architecture such as that shown in FIG. 2. In this particular case, gelatin branches are covalently grafted onto a longer chitosan chain, and the grafted gelatins can undergo a physical association with a second chitosan chain to form a three dimensional gel network. Because tyrosinase-catalyzed gels can be formed at temperatures above the gel point of gelatin, it is believed that in the case of these specific gels, gelatin triple helices are not necessarily involved.

Transglutaminase catalyzes the crosslinking reaction between glutamine and lysine residues of proteins, as shown in FIG. 1. It has been observed that transglutaminase catalyzes the formation of gels using gelatin alone. Unexpectedly, however, we found that while chitosan is not required for the formation of a gel using transglutaminase, its inclusion typically increases the rate of gel formation and the strength of the resulting gel. The strength of transglutaminase-catalyzed gels made using gelatin can, in many cases, be increased by increasing the gelatin/polysaccharide ratio.

As compared to polypeptide/chitosan gels formed using tyrosinase, gels from transglutaminase are typically formed more slowly, are stronger, and are permanent (e.g., they do not readily break during the time of the experiment). Additionally, gelatin/chitosan gels formed using transglutaminase typically do not undergo significant transitions when they are cooled or heated near gelatin's coil-to-helix transition temperature. Based on these discoveries, but without being limited by theory, it is believed that the gelatin in these gels is cross-linked. See Kuijpers A J, et al., *Macromolecules* 32:3325–3333 (1999); Van Den Bulcke A I, et al., *Biomacromolecules* 1:31–38 (2000). Thus, transglutaminase provides an alternative-to chemical methods of crosslinking gelatin, and the addition of chitosan provides a means of adjusting the mechanical properties of the gel.

In contrast to gels formed using transglutaminase, gelatin-based gels are not formed simply by contacting gelatin with tyrosinase. However, gels are formed when tyrosinase is reacted with gelatin in the presence of chitosan. Moreover, these gels form rapidly (on the order of half hour) and have intermediate strengths, which can be adjusted by varying the relative concentrations of gelatin and chitosan. The typical lifetime of gelatin-chitosan gels formed from tyrosinase is limited, with the elastic modulus reaching a maximum about five hours after the reaction is initiated.

Without being limited by theory, tyrosinase-catalyzed gelatin-chitosan gels are believed to comprise a small number of gelatin chains grafted onto the much longer chitosan polymer as compared to gels prepared using transglutaminase. In specific instances, only about 20% of the gelatin chains undergo reaction with tyrosinase. This low level of reaction is consistent with gelatin's low tyrosine content. Importantly, gelatin's tyrosyl residues are located in the telopeptide region, and are not found in the (Gly-X-Y) tripeptide repeat region that is responsible for gelatin's triple helix formation. Mayo K H, *Biopolymers* 40:359–370 (1996); Brown E M, Farrell H M, Jr. and Wildermuth R J, *J. Prot. Chem.* 19:85–92 (2000); King G, Brown E M and Chen J M, *Prot. Eng.* 9:43–49 (1996). Thus, it is believed that grafting may not disrupt gelatin's structure and the grafted gelatin chains may retain the ability to undergo helix formation with other gelatin chains. This possibility is supported by observations that tyrosinase-catalyzed gelatin-chitosan gels undergo transitions at temperatures consistent with gelatin's gel formation and melting temperatures. Again without being limited by theory, it is believed that tyrosinase-catalyzed gelatin-chitosan gels are strengthened by cooling because triple-helix network junctions are formed, and that these helices can be "melted" by heating above gelatin's gel point. However, this "melting" is not believed to destroy the network formed by tyrosinase (i.e., the gels are weakened but not converted to solutions by heating).

Without being limited by theory, it is believed that particular tyrosinase-catalyzed gelatin/chitosan gels have a three dimensional gel network resulting from attractive intermolecular interactions between a grafted gelatin chain and a second chitosan chain (e.g., a negatively charged patch of grafted gelatin may interact with a positively charged region of a second chitosan chain).

The mechanical properties of polymers and gels of the invention can vary dramatically depending on the specific polypeptide and polysaccharide molecules used, the relative concentrations of each, and the enzyme used in their preparation. This is apparent from steady-state and time-dependent observations. For example, rheological methods can readily be used to characterize gels and gel-forming processes. See, e.g., Clark A H and Ross-Murphy S B, *Adv. Polym. Sci.* 83:58–192 (1987); Kavanagh G M and Ross-Murphy S B, *Prog. Polym. Sci.* 23:533–562 (1998); Gilsenan P M and Ross-Murphy S B, *J. Rheol.* 44:871–883 (2000); Hsu S-H and Jamieson A M, *Polymer* 34:2602–2608 (1993); Winter H H and Mours M, *Adv. Polym. Sci.* 134: 165–234 (1997).

Methods of the invention offer a variety of benefits. For example, the use of enzymes to catalyze polymer and gel-formation eliminates the need for low-molecular weight compounds (e.g., monomers, initiators, and crosslinking agents), most of which are toxic. Second, the enzymes catalyze gel formation directly from the polymers without requiring either light or the prior grafting of crosslinkable functionality (e.g., acrylates are commonly grafted onto polymers and macromers to permit them to undergo subsequent gel formation). Third, gels can be formed using biocompatible and widely available biopolymers, such as gelatin and chitosan. Finally, enzymatic gel formation is simple and occurs under mild conditions.

In part because of the many advantages they offer, the polymers, gels and methods of the invention are useful for a variety of purposes. One application is soft-tissue augmentation. For example, a biocompatible protein such as, but not limited to, gelatin, and a biocompatible polysaccharide such as, but not limited to, chitosan, can be inserted separately or together into a patient. Transglutaminase can then be contacted with the polymers to form a gel. Advantageously, the formation of the gel can occur after cells have been incorporated within the gelatin and/or chitosan matrix. Furthermore, as compared to other in situ methods, transglutaminase-catalyzed gel formation are advantageous because crosslinking occurs under mild conditions, without the need for low molecular weight compounds.

In view of these advantages, a particular embodiment of this invention encompasses a method of augmenting tissue, which comprises administering to a patient (e.g., a human) in need of such augmentation a first amount of a biocompatible polypeptide and a second amount of a biocompatible polysaccharide and an enzyme capable of cross-linking the polypeptide and polysaccharide. In one method, the polypeptide and polysaccharide are administered simultaneously, while in another they are administered separately.

Other potential applications for polymers and gels of the invention include their use as dressings for burns and wounds. For example, a gelatin/chitosan solution could be applied to cover a complex wound surface, while this dressing would begin to acquire mechanical strength almost immediately after application. A potential benefit of such an in situ dressing would be the ability of the gelatin component to promote cell attachment and growth. Additionally, the chitosan component may contribute hemostatic, antimicrobial, and wound healing properties to such a dressing. The limited lifetime of tyrosinase-catalyzed gels may also be desirable as it may allow the dressing to be periodically "removed" and replaced without tissue damage. In some cases, it may even be desirable to shorten the gel's lifetime to facilitate treatment. Consequently, one embodiment of the invention contemplates the use of chitosan-hydrolyzing enzymes to dissolve the gel when desired.

EXAMPLE

Certain aspects of specific embodiments of the invention can be understood from the non-limiting examples provided below.

Gelatin (type A from porcine skin, 175 Bloom), chitosan from crab shells (85% deacetylation), and the enzyme tyrosinase (3400 U/mg) were obtained from Sigma Chemicals. Gelatin's molecular weight is reported by the supplier to be 40–50 kDa, and chitosan's molecular weight was determined by light scattering to be approximately 300 kDa. The microbial transglutaminase was kindly donated to the United States Department of Agriculture by Ajinomoto Co.

A concentrated gelatin solution (10 w/v %) was prepared by dissolving 10 g gelatin into 100 ml of deionized water at temperature greater than 40° C. The pH of this solution was then adjusted to 6.0 by the addition of small amounts of 1M NaOH. A concentrated chitosan solution (1.6 w/v %) was prepared by adding 1.6 g chitosan to 100 ml deionized water and intermittently adding small amounts of 2M HCl to maintain the pH of the solution at about 2–3. After stirring overnight, the insoluble particles were removed by filtration. This chitosan solution was then diluted and the pH increased to 5.9–6.0 with 1M NaOH.

Gel formation was initiated by adding enzyme (tyrosinase 60 U/ml or transglutaminase 10 U/g-gelatin) to solutions containing gelatin, or blends containing gelatin and chitosan. In most cases, the blends consisted of 5% gelatin and 0.32% chitosan. All reactions were conducted at 35° C. and a pH of 5.8 to 6. This pH was selected because chitosan remains soluble—precipitation occurs at higher pHs.

The rheological properties of the solutions and gels were measured using various approaches as described herein. In all cases, a ThermoHaake RHEOSTRESS1 rheometer was used with a parallel plate sensor (PP60 Ti) at a gap distance of 1 mm. For solutions and weak gels, oscillatory tests were performed with a controlled stress of 0.5 Pa and a frequency of 0.1 Hz. For strong gels, oscillatory tests were performed with a controlled strain of 5% and a frequency of 0.1Hz. For gels of intermediate strength, we observed equivalent results with either method (controlled stress or controlled strain). To limit evaporation during our measurements, we covered the parallel plate sensor with a low viscosity silicon oil (S159–500, Fisher Scientific).

RESULTS

Initial studies to examine enzyme-catalyzed gel formation were conducted by loading 5% gelatin solutions onto a rheometer and following changes in properties over time. At 35° C., 5% gelatin behaves as a solution with the viscous modulus (G") exceeding the elastic modulus (G'). Additionally, the rheological properties of a 5% gelatin "control" do not change during the 5 hour measurement period.

Figure 3:
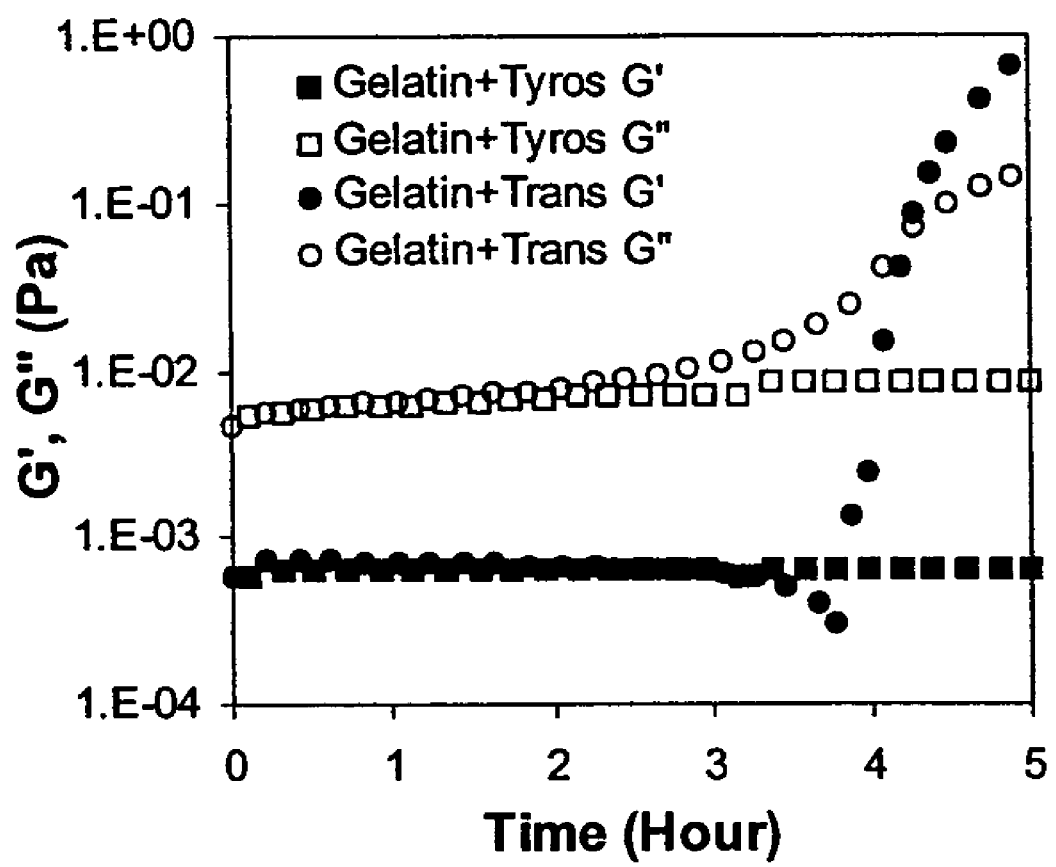
FIG. 3. Rheological properties of gelatin with transglutaminase or tyrosinase added.

To examine the effect of transglutaminase, this enzyme was added to a 5% gelatin solution just prior to loading the sample on the rheometer. FIG. 3 shows that little change in rheological properties was observed during the first 2 hours. After 2 hours, G" for the gelatin solution incubated with transglutaminase was observed to increase gradually. FIG. 3 shows that G' for this system was nearly constant for the first 4 hours after which it increased suddenly. Approximately 10 minutes after G' began to increase, G' was observed to become larger than G". The time at which G' becomes larger than G" is commonly used as a measure of the gel point. Near the gel point, the complex viscosity ($\eta^*$) was also observed to increase dramatically. These results indicate that transglutaminase can catalyze gel forming reactions with a gelatin solution.

When tyrosinase was incubated with a 5% gelatin solution, a slight reddening of the solution was visually observed indicating that some reaction had occurred. However, FIG. 3 shows that incubation of a 5% gelatin solution with tyrosinase leads to no significant changes in rheological properties during the 5 hours of the experiment. Unlike transglutaminase, tyrosinase is unable to catalyze gel forming reactions with gelatin alone.

Figure 4:
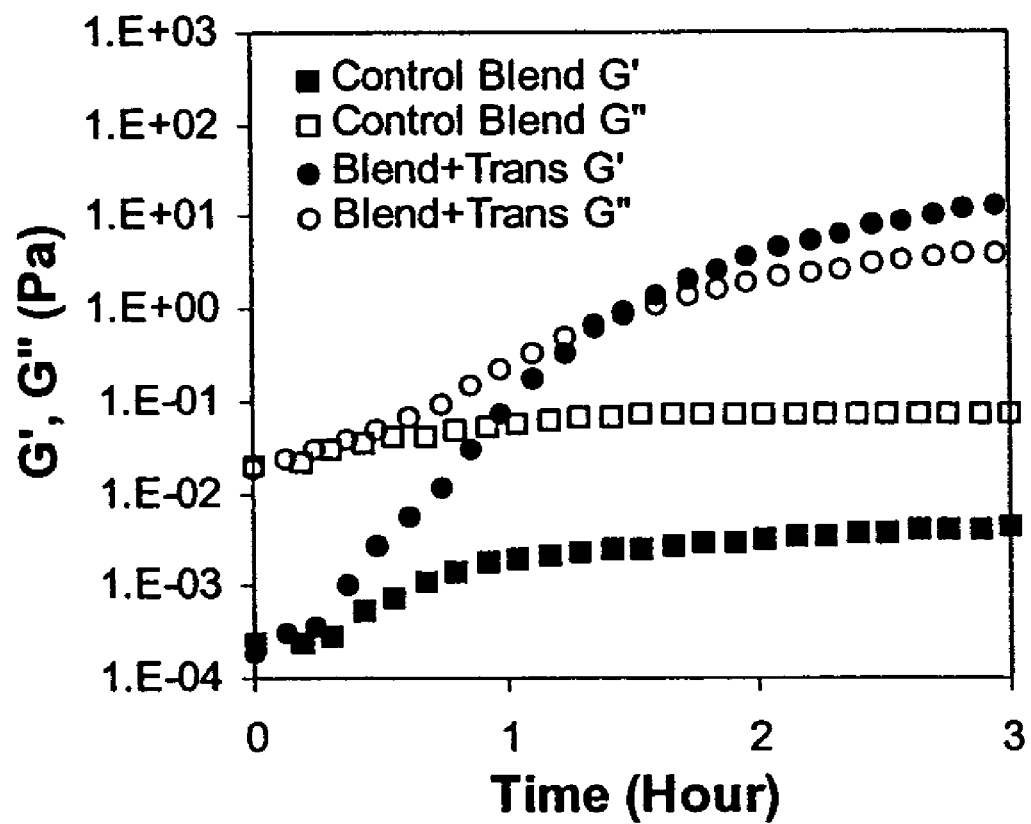
FIG. 4. Rheological properties of a gelatin and chitosan blend with transglutaminase added.

FIG. 4 also shows results from experiments in which blends of gelatin (5%) and chitosan (0.32%) were incubated with the enzymes. Like gelatin, the "control blend" behaves as a solution at 35° C. Also, FIG. 4 shows that the rheological properties of the control blend remain relatively constant during the 3 hour incubation. The small increases in G' and G" observed for the control blend are presumably due to evaporation.

FIG. 4 shows that when gelatin and chitosan blends were incubated with transglutaminase both moduli increased steadily. The increase in G' was more rapid than that of G" and the gel point was reached at about 1.5 hours. After the gel point, both moduli continued to increase for the transglutaminase-catalyzed gelatin-chitosan gel. Comparison of FIG. 3 and FIG. 4 indicates that chitosan is not necessary for transglutaminase-catalyzed gel formation although the presence of chitosan significantly reduces the time for gel formation (1.5 versus 4 hours).

Figure 5:
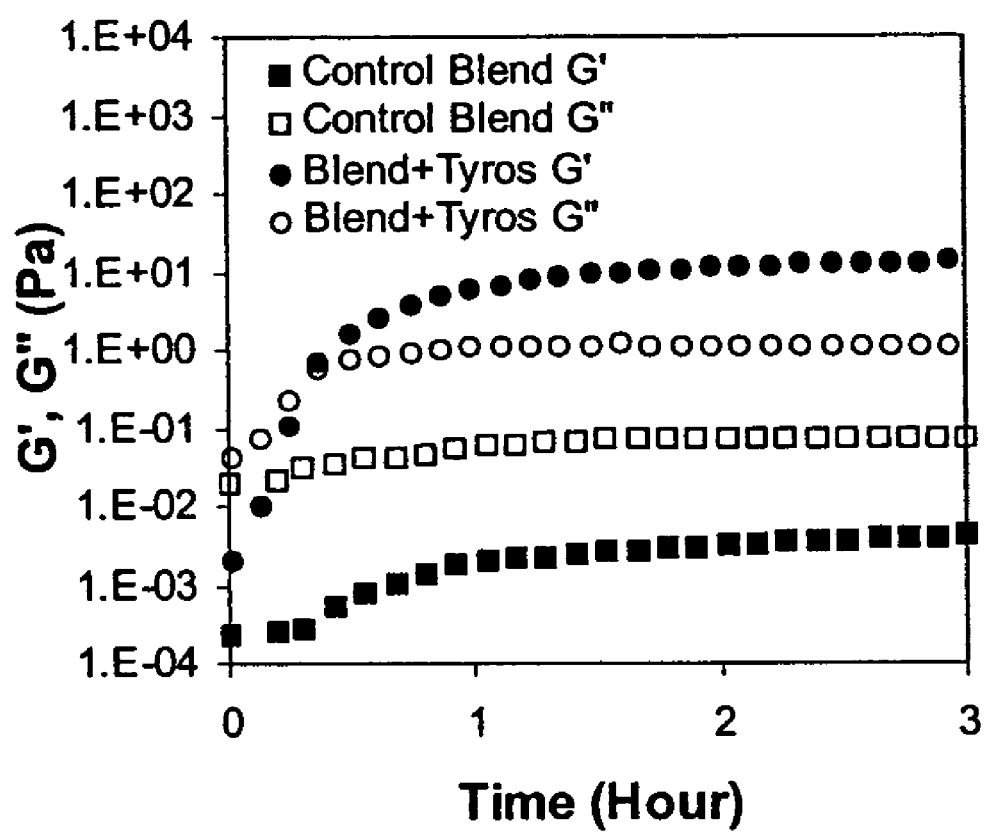
FIG. 5. Rheological properties of a gelatin and chitosan blend with tyrosinase added.

When tyrosinase was incubated with the blend, FIG. 5 shows that the moduli increase almost immediately and the gel point occurs only 20 minutes after initiating the reaction. After 1 hour, the moduli appear to reach plateaus. Chitosan is necessary for tyrosinase-catalyzed gel formation. However, chitosan alone is not sufficient for tyrosinase-catalyzed gel formation, as no gels are formed in the absence of gelatin (i.e., tyrosinase does not react with chitosan but with the tyrosyl residues of gelatin).

Figure 6:
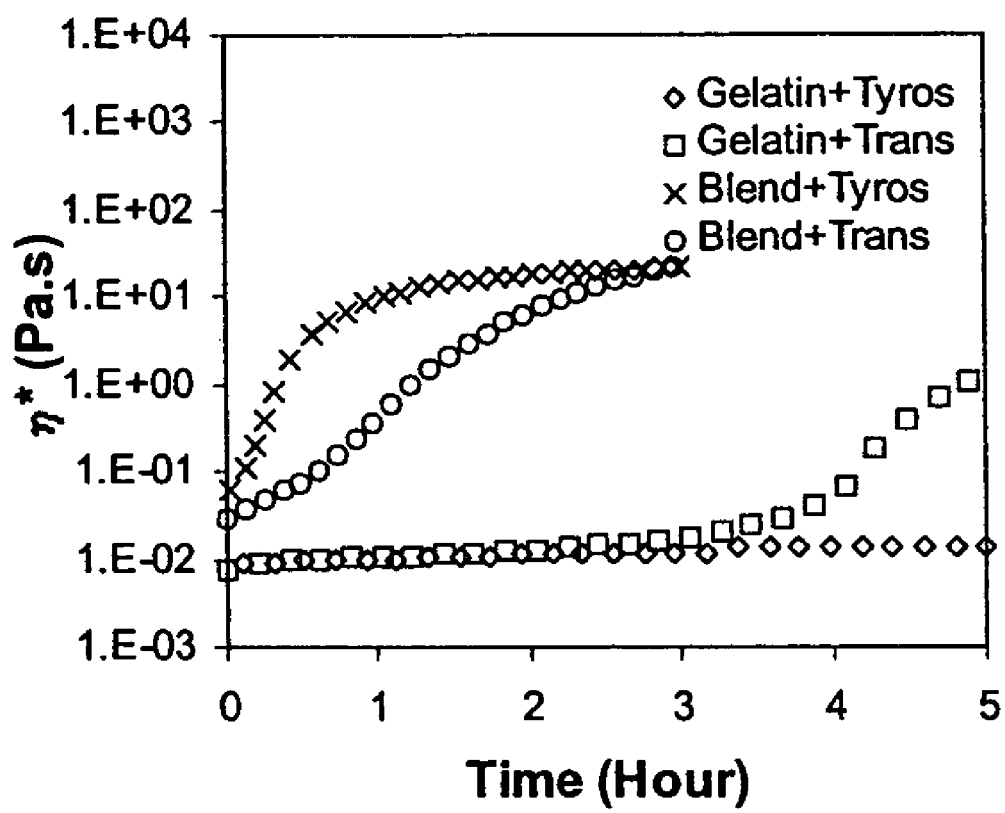
FIG. 6. Viscosity over time for gelatin and gelatin-chitosan blends incubated with transglutaminase or tyrosinase.

FIG. 6 summarizes the results from this study by showing the complex viscosity ($\eta^*$) versus time for gelatin solutions and gelatin-chitosan blends incubated with the two enzymes. Transglutaminase-catalyzed reactions led to an increase in $\eta^*$ for gelatin solutions, while the addition of chitosan to the gelatin solutions reduced the time required for η* to increase. Tyrosinase-catalyzed reactions led to a rapid increase in η* for the blend, but no increase in η* was observed for the gelatin solution that lacked chitosan.

Figure 7:
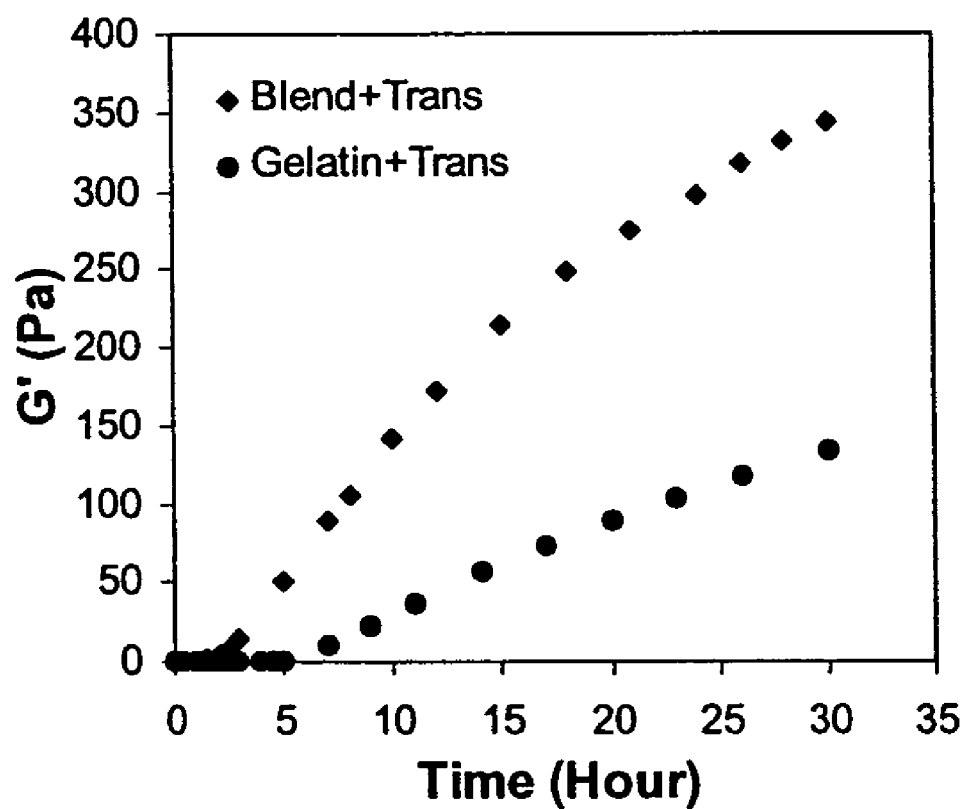
FIG. 7. Transglutaminase-catalyzed gel formation of gelatin with and without chitosan FIG. 8. Tyrosinase-catalyzed gel formation of gelatin and chitosan.

A second study was initiated to examine changes in rheological properties over a longer period of time. For this experiment, we added enzyme to solutions, immediately loaded the samples, and programmed the rheometer to perform intermittent measurements. FIG. 7 shows that when transglutaminase was incubated with a 5% gelatin solution, the strength of the gel (i.e., G') began to increase after about 5 hours and then increased slowly over the 30 hour experiment. When transglutaminase was incubated with a gelatin-chitosan blend, FIG. 7 shows that G' began increasing after about one hour, and continued increasing over the course of 30 hours reaching a relatively high value (350 Pa). Thus, transglutaminase-catalyzed gel formation was more rapid and yielded stronger gels when reactions were performed in the presence of chitosan.

Figure 8:
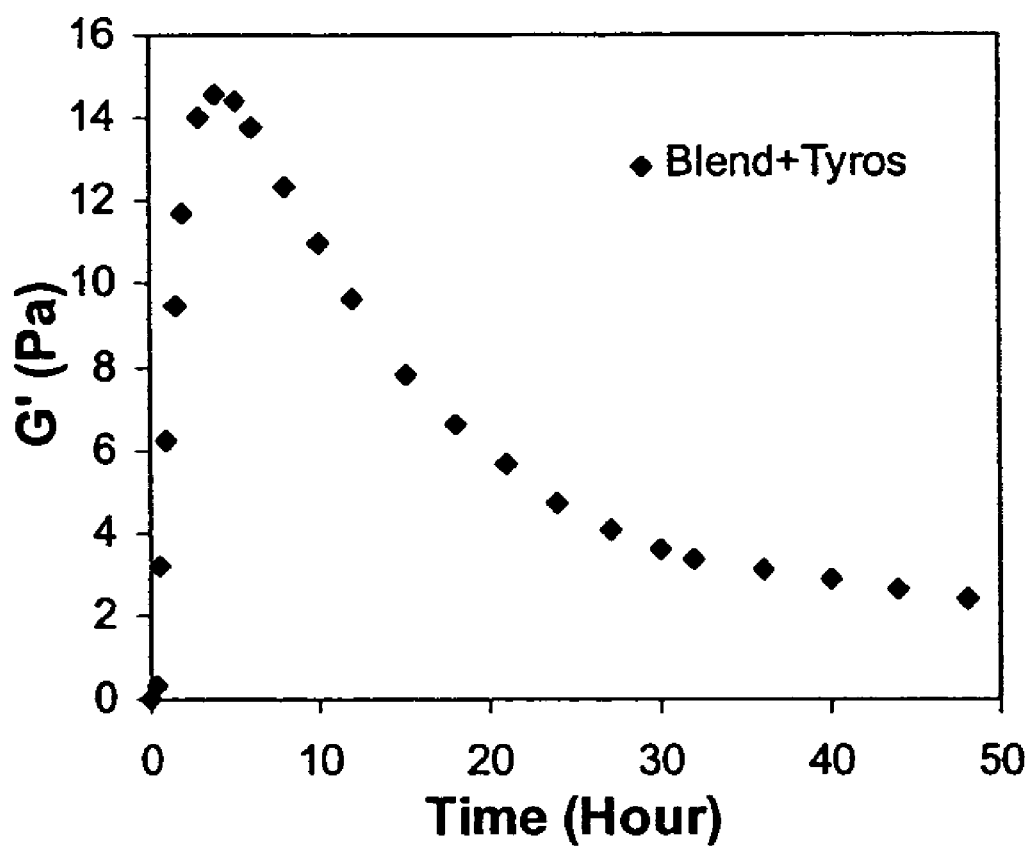

When tyrosinase was incubated with a gelatin-chitosan blend, FIG. 8 shows that G' increased rapidly, reached a maximum of 15 Pa after 5 hours, and then decreased over the remaining 40 hours of the experiment. The observation that G' decreases at long time is consistent with visual observations that tyrosinase-catalyzed gelatin-chitosan gels break over the course of a couple days. In summary, FIGS. 7 and 8 demonstrate that transglutaminase catalyzes the formation of strong and permanent gels, while tyrosinase catalyzes the formation of weaker, transient gels.

Figure 9:
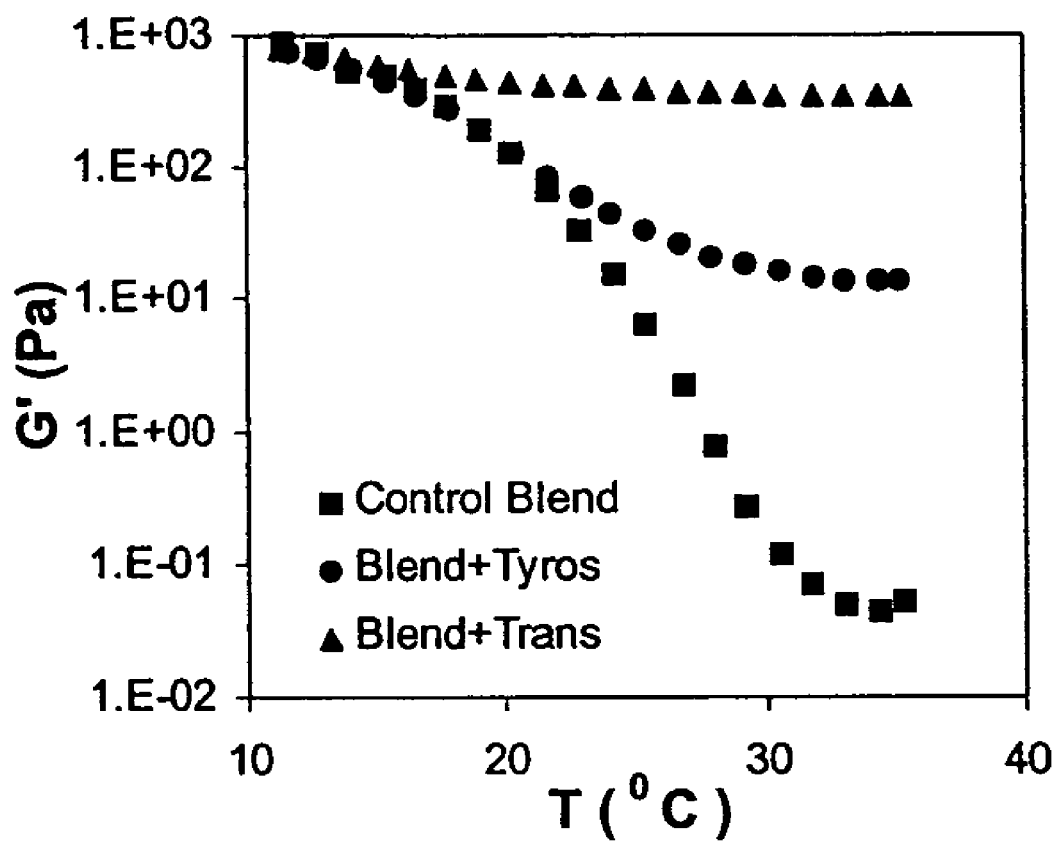
FIG. 9. Thermal behavior of enzyme-catalyzed gels.
Figure 10:
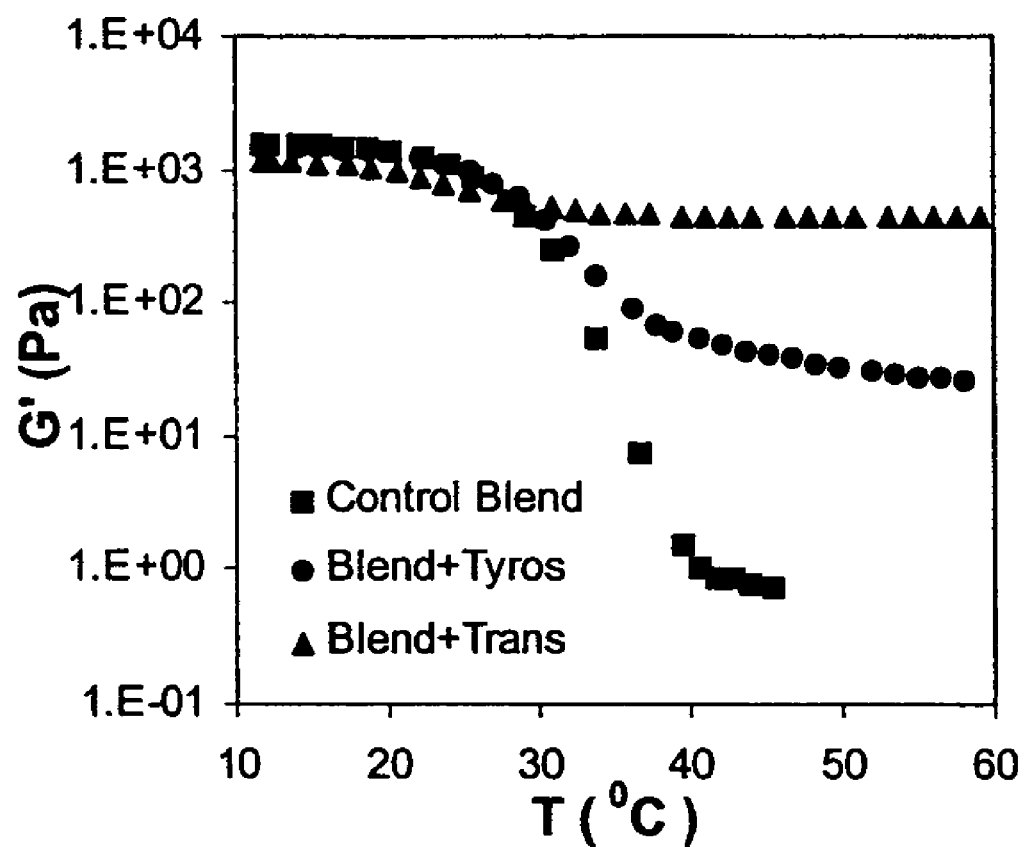
FIG. 10. Thermal behavior of enzyme-catalyzed gels.

In a third study, the thermal behavior of the gels was investigated. The control in FIGS. 9 and 10 is a gelatin-chitosan blend that was loaded onto the rheometer, held at 35° C. for 3 hours and then cooled at 0.3° C./minute. FIG. 9 shows that when this control blend was cooled below about 30° C., the G' increased markedly and gels were formed (for clarity G" is not shown). Gel formation for this control blend is believed to be due to the thermally reversible coil-to-helix transition characteristic of gelatin. After the gel had been cooled to 10° C., it was held at that temperature for 2 hours and then heated at 1° C./minute. FIG. 10 shows that G' for this control gel decreased markedly after the temperature was increased above about 30° C. This decrease in G' is believed to be due to the helix-to-coil transition responsible for the melting of gelatin gels.

FIGS. 9 and 10 show the thermal behavior of a trans-glutaminase-catalyzed gelatin-chitosan gel. For this, we added transglutaminase to the blend and immediately loaded the sample onto the rheometer. The samples were allowed to react at 35° C. for 30 hours so the gels would be formed between the rheometer's parallel plates. This procedure eliminated the difficulty of loading pre-formed gels onto the rheometer and allowed us to measure the properties of gels that had not been damaged during sample loading. After incubation, the gels were then cooled, held, and heated as described above for the control blend. FIGS. 9 and 10 show that only small changes in G' were observed during cooling and heating of the transglutaminase-catalyzed gels, respectively. At all times during cooling and heating, G' for the transglutaminase-catalyzed gels was greater than G" indicating that these gels were never melted. Similar trends were observed for a gelatin sample incubated with transglutaminase (but not chitosan) although G' for this gelatin sample was less than G' for the transglutaminase-catalyzed gelatin-chitosan gel.

The thermal behavior of tyrosinase-catalyzed gels is also shown in FIGS. 9 and 10. For this study, tyrosinase was added to the gelatin-chitosan blend, the sample was immediately loaded onto the rheometer, gels were formed by incubation at 35° C. for 3 hours, and the samples were subjected to the same thermal treatments described above. FIG. 9 shows that G' increased significantly when the sample was cooled below about 30° C. When the sample was heated above 30° C., FIG. 10 shows that G' decreased. The transitions observed with the tyrosinase-treated sample occurred at temperatures consistent with gel formation and gel melting of the control blend. In contrast to the control blend however, G' for the tyrosinase-treated sample never decreased below G" and thus the tyrosinase-catalyzed gelatin-chitosan gels were not broken by this thermal treatment.

Figure 11:
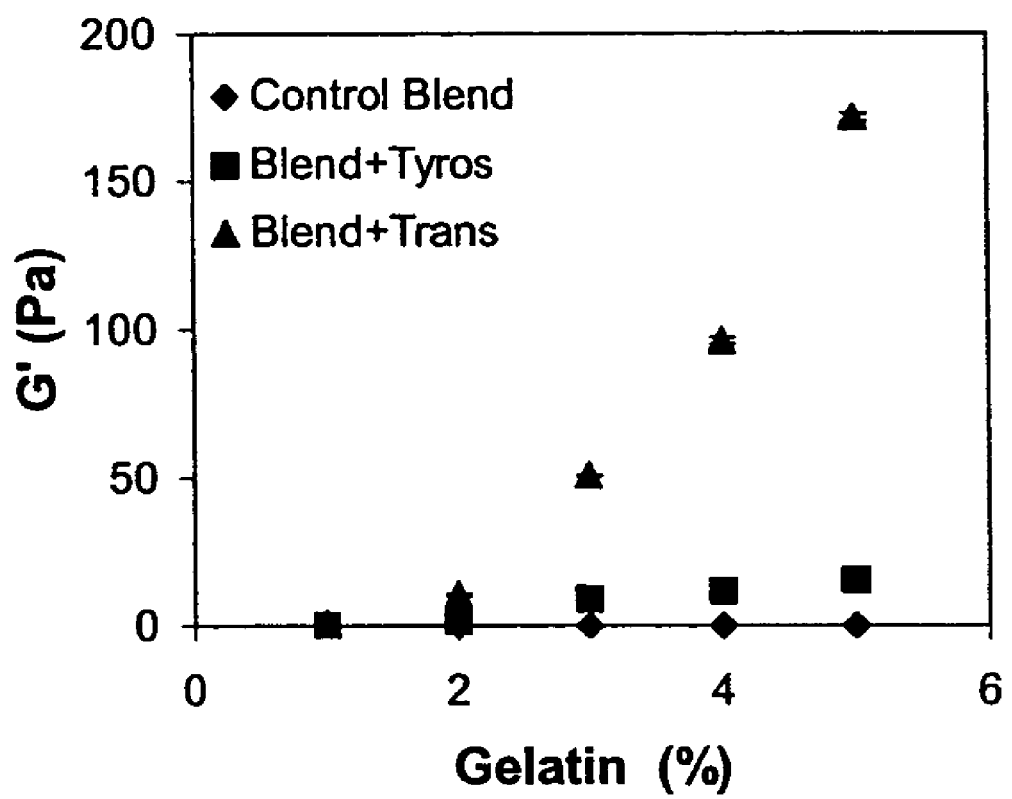
FIG. 11. Gel strength with varying concentrations of gelatin.

In a final set of experiments, we examined how the gel strength varied with composition. In these studies the gels were formed outside the rheometer and gel samples were loaded. FIG. 11 shows results for samples prepared with 0.32% chitosan and varying levels of gelatin. The control samples that were incubated without enzyme did not form gels and G' for these samples remained low at all gelatin concentrations.

The samples reacted with transglutaminase were incubated at 35° C. for 30 hours and then loaded onto the rheometer. FIG. 11 shows that samples reacted with 0.32% chitosan and 1% gelatin had little strength (low G'). Above 2% gelatin, the strength of the transglutaminase-catalyzed gelatin-chitosan gels was observed to increase markedly with increasing gelatin. In fact, FIG. 11 suggests an exponential increase in G' with gelatin concentration.

To examine the effect of gelatin concentration on tyrosinase-catalyzed gels, samples were reacted for 3 hours prior to measurement. FIG. 11 shows that no strength was observed for samples reacted at low gelatin concentrations, and that G' increased linearly with gelatin content. In comparison, the tyrosinase-catalyzed gels were considerably weaker than the transglutaminase-catalyzed gels.

Figure 12:
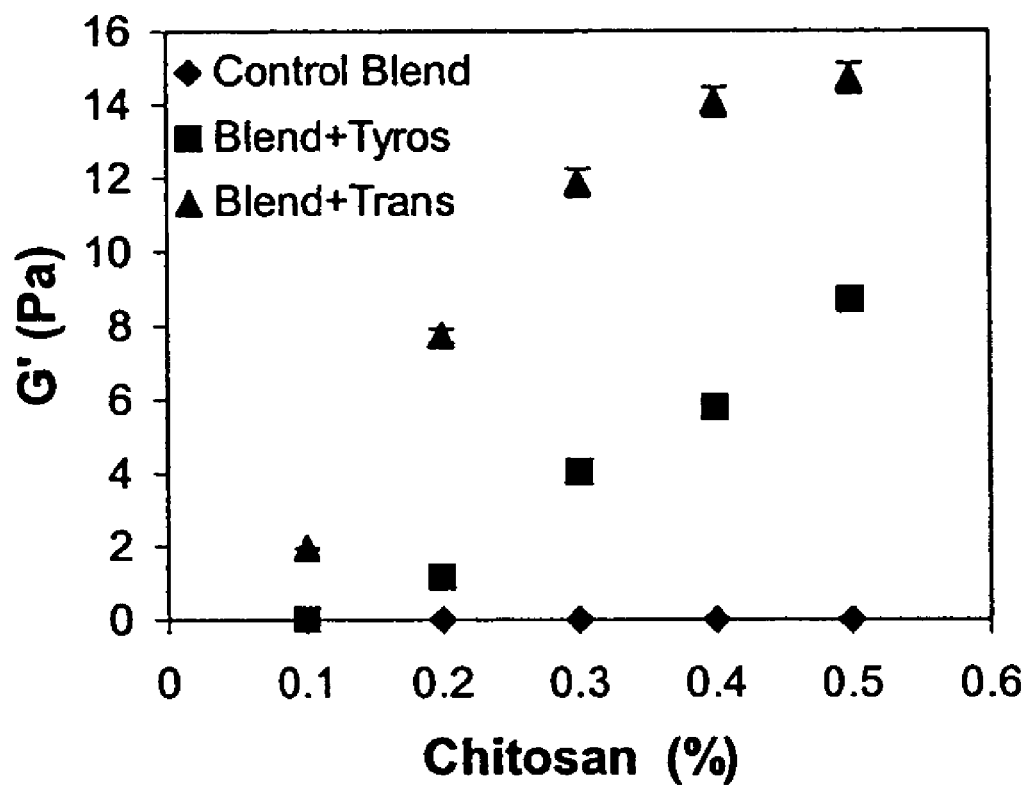
FIG. 12. Gel strength with varying concentrations of chitosan.

In an analogous study, gels were prepared by reacting enzyme with 2% gelatin solutions in the presence of varying levels of chitosan. As expected, FIG. 12 shows that control solutions that were incubated in the absence of enzyme did not form gels. Samples incubated with transglutaminase formed gels even at low chitosan concentration. This is consistent with results in FIG. 3 that show transglutaminase can catalyze gel formation of gelatin solutions in the absence of chitosan. FIG. 12 also shows that the strength of trans-glutaminase-catalyzed gels increased substantially and monotonically with chitosan. FIG. 12 shows that gel formation did not occur when tyrosinase was incubated with a 2% gelatin solution that had low levels of chitosan (0.1%). FIG. 12 also shows that the strength of the tyrosinase-catalyzed gels increased linearly with increasing chitosan concentration.

All cited references are incorporated herein in their entireties by reference. No reference cited or discussed herein is admitted to constitute prior art to the disclosed invention, which is not limited by the specific examples provided herein but is best understood in view of the appended claims.

We claim:

1. An isolated polymer comprising chitosan bound to residues of two or more polypeptides of different types, wherein at least one of the residues comprises a tyrosine residue.

2. A method of augmenting tissue of a patient, comprising:
   (A) administering to a patient in need of tissue augmentation: (i) amounts of two or more polypeptides of different types, wherein at least one of said polypeptides comprises a tyrosine residue, (ii) an amount of chitosan, and (iii) a tyrosinase enzyme; and (B) permitting said tyrosinase enzyme to form a polymer comprising chitosan bound to residues of said polypeptides;

wherein said polymer augments the tissue of said patient.

3. The method of claim 2, wherein the patient is a human.

4. The method of claim 2, wherein one of said polypeptides comprises gelatin.

5. A method of dressing a wounded surface area of a patient, comprising:

(A) dressing a wounded surface area of a patient in need of a wound dressing with: (i) amounts of two or more polypeptides of different types, wherein at least one of said polypeptides comprises a tyrosine residue, (ii) an amount of chitosan, and (iii) a tyrosinase enzyme; and (B) permitting said tyrosinase enzyme to form a polymer comprising chitosan bound to residues of said polypeptides;

wherein said polymer dresses the wounded surface of said patient.

6. The method of claim 5, wherein the wound comprises a burn.

7. The method of claim 5, wherein the patient is a human.

8. The method of claim 5, wherein one of said polypeptides comprises gelatin.

9. A method of forming a polymer of chitosan and two or more polypeptides of different types, wherein at least one of said polypeptides comprises a tyrosine residue, wherein said method comprises incubating amounts of said chitosan and said polypeptides together in the presence of a tyrosinase enzyme under conditions sufficient to bind said chitosan to said polypeptides.

10. The method of claim 9, wherein one of said polypeptides comprises gelatin.

* * * * *